(12) United States Patent
Burks

(10) Patent No.: US 10,452,200 B2
(45) Date of Patent: Oct. 22, 2019

(54) MITIGATION OF UNINTENDED EFFECTS OF INPUTS

(71) Applicant: HEWLETT-PACKARD DEVELOPMENT COMPANY, L.P., Houston, TX (US)

(72) Inventor: Ricky Thomas Burks, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/748,006

(22) PCT Filed: Oct. 12, 2015

(86) PCT No.: PCT/US2015/055107
§ 371 (c)(1),
(2) Date: Jan. 26, 2018

(87) PCT Pub. No.: WO2017/065727
PCT Pub. Date: Apr. 20, 2017

(65) Prior Publication Data
US 2018/0217714 A1    Aug. 2, 2018

(51) Int. Cl.
*G06F 3/041* (2006.01)
(52) U.S. Cl.
CPC ................... *G06F 3/0418* (2013.01)
(58) Field of Classification Search
CPC ...... G06F 3/016; G06F 3/03545; G06F 3/038; G06F 3/041; G06F 3/0416; G06F 3/0418; G06F 3/0488; G06F 2203/0381; G06F 2203/04104; G06F 2203/04105; G06F 3/0414
See application file for complete search history.

(56) References Cited

U.S. PATENT DOCUMENTS

| 8,446,372 | B2 | 5/2013 | Locker et al. |
| 9,405,328 | B2* | 8/2016 | Stewart .................. G06F 1/169 |
| 2007/0152976 | A1 | 7/2007 | Townsend et al. |
| 2010/0127995 | A1 | 5/2010 | Rigazio et al. |

(Continued)

FOREIGN PATENT DOCUMENTS

| CN | 102810017 A | 12/2012 |
| WO | WO-2009088672 A2 | 7/2009 |
| WO | WO-2011149545 | 12/2011 |

OTHER PUBLICATIONS

International Searching Authority., International Search Report and Written Opinion dated Jul. 12, 2016 for PCT Application No. PCT/US2015/055107 Filed Oct. 12, 2015, 12 pages.

(Continued)

*Primary Examiner* — Nelson M Rosario
(74) *Attorney, Agent, or Firm* — Brooks, Cameron & Huebsch PLLC

(57) ABSTRACT

Example implementations relate to mitigation of unintended effects of inputs. In one example, mitigation of unintended effects of inputs includes monitoring a provided input to a touchpad included in an electronic device, comparing the provided input to a specific threshold set by the electronic device based on provided inputs to the touchpad, and mitigating an unintended effect of the provided input based on the comparison of the provided input to the specific threshold.

12 Claims, 3 Drawing Sheets

(56) References Cited

U.S. PATENT DOCUMENTS

| | | |
|---|---|---|
| 2010/0245258 A1* | 9/2010 | Stewart ............... G06F 3/03547 345/173 |
| 2011/0291922 A1 | 12/2011 | Stewart et al. |
| 2012/0062488 A1 | 3/2012 | Lin et al. |
| 2013/0246861 A1 | 9/2013 | Colley |
| 2014/0267135 A1 | 9/2014 | Chhabra |
| 2014/0368436 A1* | 12/2014 | Abzarian ............... G06F 3/0488 345/168 |
| 2014/0368455 A1 | 12/2014 | Croisonnier et al. |
| 2015/0253874 A1 | 9/2015 | Reyes |
| 2015/0370323 A1* | 12/2015 | Cieplinski ............... G06F 3/013 345/156 |
| 2017/0344185 A1* | 11/2017 | Ohlsson ................ G06F 3/0418 |

OTHER PUBLICATIONS

Martin Brinkmann, "Touchpad Blocker, Block Accidental Keyboard with Touchpad Actions", Dec. 1, 2010.

* cited by examiner

MITIGATION OF UNINTENDED EFFECTS OF INPUTS

BACKGROUND

Touchpads such as capacitive touchpad pointing devices are used in a variety of electronic devices including personal computers. For example, a touchpad may facilitate user manipulation a graphics cursor (i.e., a cursor) on a display of an electronic device. The touchpad may include a sensitive planar surface and a mechanism to detect a position of an object such as a finger and/or a stylus, near or in contact with, the sensitive planar surface.

DETAILED DESCRIPTION

Figure 1:
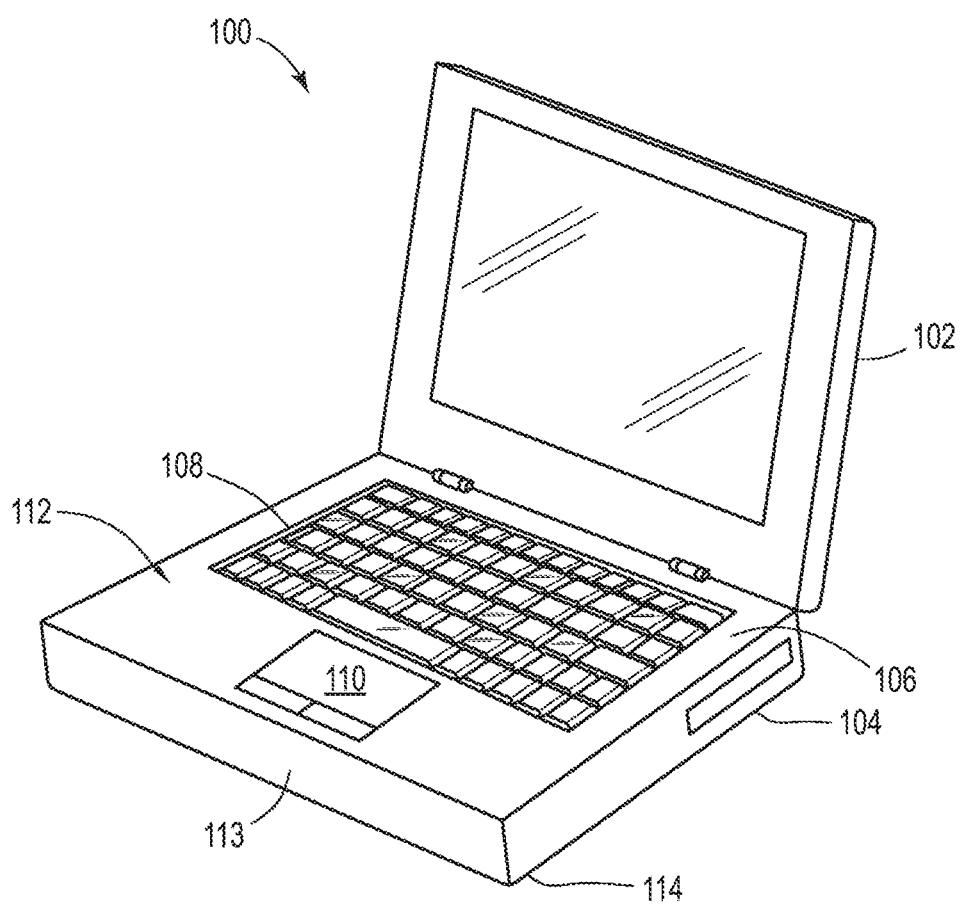
FIG. 1 illustrates a view of an example of an electronic device suitable for mitigation of unintended effects of inputs according to the disclosure.

FIG. 1 illustrates a view of an example of an electronic device 100 suitable for mitigation of unintended effects of inputs according to the disclosure. Examples of electronic devices include mobile phones, payment instruments, tablets, desktop computers, and/or laptop computers, among other types of electronic devices. That is, while the electronic device 100 is illustrated as a laptop, the disclosure is not so limited in that the electronic device can be various electronic devices having more or fewer components than electronic device 100 as illustrated in FIG. 1 and be suitable for mitigation of unintended effects of inputs, as described herein. Electronic device 100 can be analogous to electronic device 200 discussed with respect to FIG. 2 herein.

As illustrated, the electronic device 100 includes a display 102 coupled (e.g., hingeably, removably, and/or otherwise coupled) to a base 104. The base 104 can include a top surface 106 and a bottom surface 114. A keyboard 108 and a touchpad 110 can be included in the top surface 106. The top surface 106 can include a handrest area 112. For example, the handrest area 112 can include an area of the top surface 106 located adjacent to the keyboard 108 (i.e., the area between the keyboard 108 and the front surface 113 of the base 104). The electronic device 100 includes a processing resource, a memory resource, and a driver, as described in detailed with respect to FIG. 2.

The touchpad 110 can be provided in or near the handrest area 112. The touchpad 110 can facilitate provided inputs (i.e., user provided inputs) to be received by the electronic device 100. For instance, the touchpad 110 can include various components such as a resistive elements, capacitive elements, electromagnetic elements, and/or infrared optical elements, among other possible elements to receive provided inputs and promote mitigation of unintended effects of inputs, as described herein. Examples of provided inputs include touchpad clicks, touchpad touches, and/or other tactile inputs (e.g., inputs made via a touchpad such as dragging motions or other motions). For example, the touchpad 110 can allow a user to make selections and move a cursor by simply touching the touchpad 110 via a finger and/or stylus. The touchpad 110 can recognize the provided input (i.e., a touch) and a position of the provided input on the touchpad 110 and the electronic device 100 (e.g., a controller of the electronic device) can interpret the provided input and thereafter perform an action (e.g., move a cursor) based on the provided input.

When the user places his or her hands in position to use the keyboard 108 and/or the touchpad 110 the user's hands (e.g., the palms or heals of the hands) may contact at least some of the handrest area 112. During operation of the electronic device 100 a user may unintentionally contact the touchpad 110 resulting in an unintended provided input such as an unintended tap and/or an unintended click of the touchpad 110, for example, when intending contact with the keyboard 108 and not the touchpad 110. Similar to an intended contact of the touchpad 110, the electronic device 100 can interpret the unintended provided input and thereafter perform an action (e.g., move a cursor) as a result of the unintended contact. The effect of the action can be that the cursor may now be located at a different location on the display 102 compared to a location of the cursor prior to the unintended provided input. Such unintended effects (e.g., cursor movement and/or tap(s)/click(s)) resulting from unintended contact of the touchpad can undesirably impact a user experience with the electronic device 100. As such, it may be desirable to mitigate (e.g., negate) unintended effects.

Accordingly, examples of the disclosure include methods, systems, and computer-readable and executable instructions suitable for mitigation of unintended effects of inputs. For example, mitigation of unintended effects of inputs can include monitoring a provided input to a touchpad included in an electronic device, comparing the provided input to a specific threshold (e.g., a user specific threshold) set by the electronic device based on provided inputs to the touchpad, and mitigating an unintended effect of the provided input based on the comparison of the provided input to the specific threshold.

Notably, a specific threshold can be set by an electronic device to promote ease of use of the electronic device 100 at least in part by mitigating unintended effects (e.g., unintended movement of a cursor and/or unintended click(s) and/or tap(s)) of unintended provided inputs. Mitigating refers to comparatively reducing (e.g., reducing a length of travel of cursor) and/or negating (e.g., causing the cursor to remain in the same position) effects of unintended inputs provided to the touchpad 110.

Figure 2:
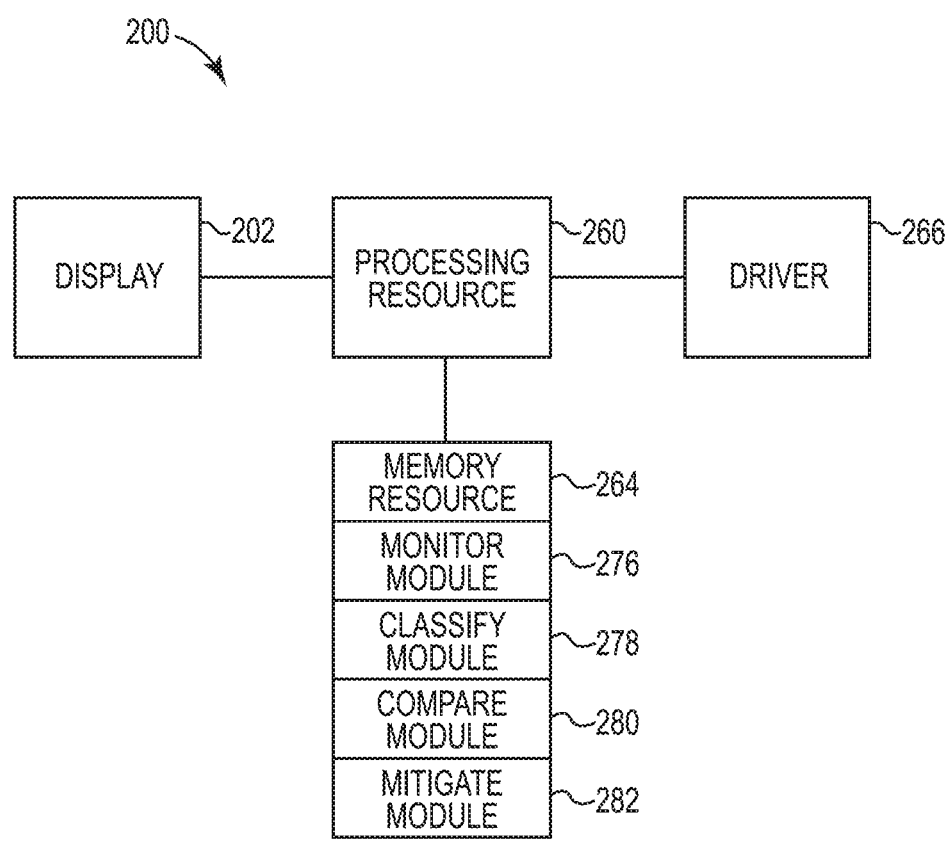
FIG. 2 illustrates a diagram of an example of an electronic device suitable for mitigation of unintended effects of inputs according to the disclosure.

FIG. 2 illustrates a diagram of an example of an electronic device suitable for mitigation of unintended effects of inputs according to the disclosure. As mentioned, electronic devices include a display 202 such as a graphical user interface (GUI). The display 202 of the electronic device can display an element of an application, for example, to promote functioning of the application on the electronic device. That is, the elements displayed can each have a respective functionality associated therewith. For example, selection of an element by tapping and/or clicking a touchpad can cause the display 202 to perform an action (e.g., display a drop down menu, display a free text area, and/or cause an application utilizing the display to perform a function). The element can be included in a plurality of elements of the application displayed in the display to facilitate a user to interact with the display (e.g., provide an input to cause the display to perform the functionality) and/or the application executing on the electronic device including the display 202. For example, a grouping of pixels in the display may represent an element such as an icon, field, among other types of elements that can receive a provided input.

The electronic device includes a processing resource 260. The processing resource 260 can be in communication with the display along with a memory resource 264 and a driver 266, for instance, a touchpad driver. The electronic device 200 can utilize hardware and instructions (e.g. software, or firmware), or hardware and logic to perform a number of functions including those described herein.

For example, the electronic device 200 can be a combination of hardware and instructions for mitigation of unintended effects of inputs. The hardware, for example can include the display 202, the processing resource 260, the memory resource 264 (e.g., computer-readable medium (CRM), database, etc.), and/or an input device such as the touchpad (not shown in FIG. 2). A processing resource 260, as used herein, can include a number of processors capable of executing instructions stored by a memory resource 264. Processing resource 260 can be integrated in a single device or distributed across multiple devices. The instructions (e.g., computer-readable instructions (CRI)) can include instructions stored on the memory resource 264 and executable by the processing resource 260 to implement a desired function (e.g., mitigate an unintended effect of the particular type of provided input based on the comparison, etc.).

The memory resource 264 can be in communication with a processing resource 260. A memory resource 264, as used herein, can include a number of memory components capable of storing instructions that can be executed by processing resource 260. Such memory resource 264 can be a non-transitory CRM. Memory resource 264 can be integrated in a single device or distributed across multiple devices. Further, memory resource 264 can be fully or partially integrated in the same device as processing resource 260, the display 202, and/or the driver 266, or it can be separate but accessible to that device and processing resource 260.

The memory resource 264 can be in communication with the processing resource 260 via a communication link (e.g., path) 262. The communication link 262 can be local or remote to a computing device associated with the processing resource 260. Examples of a local communication link 262 can include an electronic bus internal to a computing device where the memory resource 264 is one of volatile, non-volatile, fixed, and/or removable storage medium in communication with the processing resource 260 via the electronic bus. Similarly, the processing resource 260 can be in communication with the driver 266 and/or the display 202 via a communication link. The driver 266 can be integrated into an application specific integrated circuit and/or can be formed of driver logic, among other possibilities.

In various examples, the driver 266 can identify respective frequencies of particular types of provided inputs received by the touchpad from a specific user, set a threshold type of provided input based on identified respective frequencies of the particular types of inputs from the specific user, compare a particular type of provided input received by the touchpad to the threshold type of provided input, and mitigate an unintended effect of the particular type of provided input received by the touchpad based on the comparison. In some examples, the driver can monitor provided inputs including at least one of taps and/or clicks provided to a touchpad. The driver 266 can set a specific threshold type of provided input in response to a login to the electronic device. In some examples, the driver can set a specific threshold to a specific threshold associated with a specific user when the specific user logs on to the electronic device, as described herein.

The memory resource 264 can include a number of modules such as a monitor module 276, classify module 278, compare module 280, and mitigate module 282. The number of modules 276, 278, 280, 282 can include CRI that when executed by the processing resource 260 can perform a number of functions including those described herein. The number of modules 276, 278, 280, 282 can be sub-modules of other modules. For example, the classify module 278 and the mitigate module 282 can be sub-modules and/or contained within the same computing device. In another example, the number of modules 276, 278, 280, 282 can comprise individual modules at separate and distinct locations (e.g., CRM, etc.).

In various example, the number of modules 276, 278, 280, 282 can be integrated along with the driver logic into a single ASIC. That is, while the number of modules 276, 278, 280, 282 and the driver logic are illustrated as separate and distinct the maybe integrated together to promote mitigation of unintended effects of inputs.

The monitor module 276 can include instructions that when executed by the processing resource monitors a provided input to a touchpad included in an electronic device. The monitor module 276 can include monitoring information representative of a frequency, a location on a touchpad, a duration, and/or an amount of force, among other information associated with a provided input to a touchpad.

The classify module 278 can include instructions that when executed by the processing resource classifies each provided input of the provided inputs as a particular type of provided input. For example, a provided input can be classified as a click or a tap, among other possible types of provided inputs, based upon information associated with a provided input to a touchpad as monitored by the monitor module 276.

For example, a respective amount of force and/or a respective duration of a provided input can be used to classify the provided input as a tap (e.g., having a comparatively short duration and/or a comparatively small amount of force when compared to other provided inputs and/or predetermined duration and/or force thresholds) or a click (having a comparatively long duration and/or a comparatively high amount of force when compared to other provided inputs and/or predetermined duration and/or force thresholds), among other possible basis to classify a provided input as a particular type of provided input.

Once classified, a log of each of the provided inputs can be maintained. Over a period of time a total number of each of the particular type of inputs and/or a frequency of each of the particular types of inputs can be identified to promote setting of a specific threshold based on such provided inputs (e.g., set based on a total number and/or a frequency of provided inputs, among other possibilities).

For example, when a total number of clicks is comparatively greater than a total number of taps then a user can be identified as predominantly using clicks. Similarly, when a frequency of clicks over a period of time is greater than a frequency of taps over a given time then a user can be identified as predominantly using clicks. In such examples, a click can be set as a threshold type of input (i.e., a default type of user input) such that effects from taps and/or other types of provided inputs can be mitigated, as described herein. A threshold type of input can be set for and associated with a specific user of an electronic device. In this manner, each user of an electronic device can have a threshold type of input set and assigned thereto based of a usage pattern specific to the user.

The compare module 280 can include instructions that when executed by the processing resource compares the provided input to a specific threshold set by the electronic device based on provided inputs to the touchpad. In various examples, the specific threshold can be set by the electronic device based on the provided inputs to the touchpad. That is, a specific threshold can be set by the electronic device automatically in contrast to other approaches the may rely on a user to alter adjustable settings associated with the electronic device in an effort to vary performance characteristics (e.g., an amount of time delay between an input to a touchpad and a resultant movement of a cursor in a display, etc.).

Put another way, the specific threshold can be set by the electronic device without a provide input to the electronic device (e.g., without touchpad click, mouse clicks, audio inputs, tactile inputs, etc.) from a user to set the specific threshold (e.g., to vary an adjustable setting associated with operation of a touchpad). In this manner, a specific threshold can be customized for and associated with a specific user (e.g., as identified by log in information and/or provided inputs to a touchpad, etc.) and/or enable readily setting specific thresholds, for example, setting a specific threshold to a specific user currently using and/or logged on to an electronic device to align with the specific users' usage type (e.g., predominantly uses clicks or predominantly uses taps of the touchpad).

In some example, a specific threshold can be associated with a respective user logged on to the electronic device such that each time the user logs onto the electronic device the user specific value is set by the electronic device to mitigate unintended effect in a manner specific to the specific user and their usage style (e.g., click or tap) of the electronic device. However, the disclosure is not so limited. That is, a specific threshold can be set by an electronic device with or without having a user logged onto the electronic device.

As used herein, a specific threshold refers to a particular value (e.g., a percentage of a total area of a touchpad) in a range of values and/or particular setting of an adjustable setting associated with the touchpad. Such specific thresholds can be set for and associated with a specific user to alter effects of provided inputs (e.g., unintentional provided inputs) to a touchpad by the specific user. Examples of such adjustable settings include an amount of delay between a first provided input (e.g., a click of a touchpad) and a second provided input of the same type (e.g., another click of a touchpad) to register as an intended double provided input, a threshold type of provided input (e.g., a click or a tap), among other adjustable settings, a threshold size (e.g., a percentage of an area of a touchpad contracted by a user to form a provided input) of a provided input to a touchpad.

In various examples, a specific threshold can be set by the electronic device. For instance, in some examples, a specific threshold can be set by the electronic device automatically (e.g., without a user provided input to set the specific threshold) based on the provided inputs to the touchpad. For example, a plurality of provided inputs can be monitored (e.g., by the monitor module 276) and an average size of a provided input and/or a threshold type of a provided input (e.g., a click of a touchpad) can be identified, etc.

In this manner, when the average size of the provided input or similar user specific size threshold is exceeded (e.g., by user unintentionally placing a palm of their hand on the touchpad when typing on the keyboard) and/or when another type of provided input (e.g., an unintended tap of a touchpad) an effect of such unintended provided inputs can be mitigated, by the mitigate module 282, as described herein, based on comparison by the compare module 280. That is, the compare module 280 can, in some examples, compare a size of a provided input (e.g., a percentage of a touchpad contacted unintentionally by a hand of a user while typing on a keyboard) to a user specific size threshold (e.g., an average size of an area of a touchpad contacted by a tap and/or a click of the touchpad by the user), among other types of comparisons of provided inputs to specific thresholds set by an electronic device based on provided inputs to a touchpad of the electronic device.

The mitigate module 282 can include instructions that when executed by the processing resource mitigates an unintended effect of the provided input based on the comparison of the provided input to the specific threshold. For instance, as mentioned the mitigate module 282 can, in some examples, mitigate an effect of a provided input when an average size of the provided input or similar user specific size threshold is exceeded. Such a user specific size threshold can be exceeded by user unintentionally placing a palm of their hand on the touchpad and contacting a percentage of area of the touchpad (e.g., 30%) that is greater than a percentage of an area of the touchpad (e.g., 5%) specified by the user specific size threshold, among other possibilities.

In some examples, the mitigate module 282 can mitigate an effect of a provided input based on a type of the provided input. For instance, when a threshold type of input is set as a click of a touchpad then effects of subsequent taps of the touchpad can be mitigated. Put another way, in some examples, mitigate module can mitigate an unintended effect when a particular type of provided input (e.g., a tap) is different than a specific type threshold (e.g., a click). However, it is noted that a touchpad can permit effects of various other types of provided inputs (e.g., drags of fingers) that are different than the specific type threshold while still mitigating effects of taps of the touchpad. That is, in some examples, a threshold type of input can be specific to a particular type of input intending to result in a selection or other interaction of an element in a display such as a tap of a touchpad or a click of a touchpad.

While described above with regard to mitigating effects of a taps, the disclosure is not so limited. Rather, a threshold type of input can be set to a variety of possible provided inputs (e.g., a tap of a touchpad) to promote mitigation of various types of provided inputs (e.g., a click of a touchpad) that are different than a particular threshold type of provided input. For instance, a threshold type of input can be set such that a click (e.g., a click in the right-hand portion of a touchpad) is mitigated.

Figure 3:
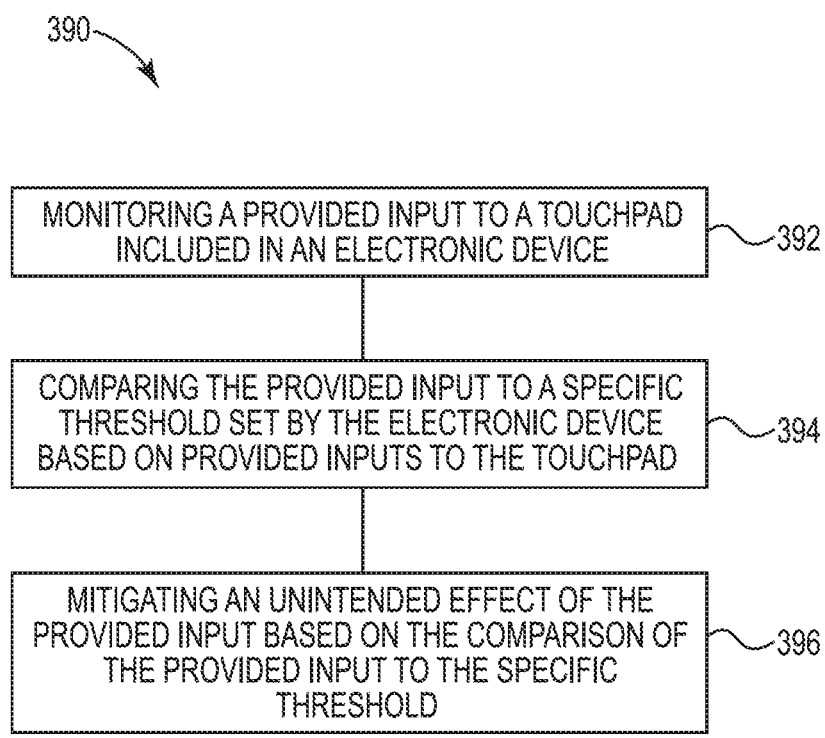
FIG. 3 illustrates a flow diagram of an example of a method suitable for mitigation of unintended effects of inputs according to the disclosure.

FIG. 3 illustrates a flow diagram of an example of a method suitable for mitigation of unintended effects of inputs according to the disclosure. As shown at 392, in various examples, the method 390 can include monitoring a provided input to a touchpad included in an electronic device. As mentioned, monitoring can include monitoring information representative of a frequency, a location on a touchpad, a duration, and/or an amount of force, among other information associated with a provided input to a touchpad.

The method 390 can include, comparing the provided input to a specific threshold set by the electronic device based on provided inputs to the touchpad, as shown at 394. In some examples, comparing can include comparing a size of a provided input to a specific size threshold. As mentioned, the size of the provided input can comprise a percentage of a total touchpad area contacted to form the provided input.

In some examples, the specific threshold is set by the electronic device automatically (e.g., without a provided input to set the specific threshold) based on the provided inputs to the touchpad (e.g., based on provided inputs previously input to the touchpad by the user). As mentioned, a specific input threshold includes at least one adjustable setting (e.g., having an adjustable value and/or type) associated with a touchpad.

The method 390 can include mitigating (e.g., automatically mitigating) an unintended effect of the provided input based on the comparison of the provided input to the specific threshold, as shown at 396. For example, mitigating an unintended effect of a provided input can occur when a percentage of a total touchpad area contacted is greater than a percentage of a total touchpad area specified by a specific threshold, among other possibilities.

In some examples, mitigating the unintended effect can comprise negating the unintended effect of the provided input. For instance, an unintended effect such as a cursor movement and/or a selection of an element in a display by the cursor can be negated in a manner so the cursor remains at a particular position on a display and/or the element in the display remains in a state (e.g., selected or unselected).

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processing resource.

The figures herein follow a numbering convention in which the first digit or digits correspond to the drawing figure number and the remaining digits identify an element or component in the drawing. Similar elements or components between different figures may be identified by the use of similar digits. For example, 100 may reference element "100" in FIG. 1, and a similar element may be referenced as "200" in FIG. 2.

Many examples can be made without departing from the spirit and scope of the system and method of the disclosure, this specification sets forth some of the many possible example arrangement and implementations. Elements shown in the various examples herein can be added, exchanged, and/or eliminated so as to provide a number of additional examples of the disclosure. In addition, the proportion and the relative scale of the elements provided in the figures are intended to illustrate the examples of the disclosure, and should not be taken in a limiting sense.

As used herein, "a number of" an element and/or feature can refer to one or more of such elements and/or features. In addition, "for example" and similar phrasing is intended to mean, "by way of example and not by way of limitation". It is understood that when an element is referred to as being "on," "connected to", "coupled to", or "coupled with" another element, it can be directly on, connected, or coupled with the other element or intervening elements may be present.

What is claimed:

1. A method comprising:
    monitoring provided user inputs to a touchpad included in an electronic device;
    identifying respective frequencies and average sizes of particular types of the provided inputs, wherein the respective frequencies are a total number of a particular type of provided input over a period of time by the user;
    setting user-specific threshold types of provided input based on identified respective frequencies and average sizes of the particular types of inputs;
    comparing user-provided frequency and size inputs received by the touchpad to the user-specific threshold types of provided input; and
    mitigating an unintended effect of the user-provided frequency and size inputs based on the comparison.

2. The method of claim 1, wherein the user-specific threshold types are set by the electronic device automatically based on provided inputs to the touchpad.

3. The method of claim 1, wherein mitigating the unintended effect comprises negating the unintended effect of the provided input.

4. The method of claim 1, wherein the user-specific threshold types are associated with a respective user logged on to the electronic device.

5. A non-transitory machine-readable medium including instructions executable by a machine to cause the machine to:
    monitor provided user inputs to a touchpad included in an electronic device;
    classify each provided input of the provided inputs as a particular type of provided input;
    compare a particular type of provided input received by the touchpad to specific threshold types set by the electronic device based on a frequency of each respective type of input and an average size of each respective type of input of the user-provided inputs to the touchpad, wherein the frequency is a total number of user-provided inputs of the respective type of input over a period of time; and
    mitigate an unintended effect of the particular type of provided input based on the comparison.

6. The medium of claim 5, wherein the unintended effect is unintended movement of a cursor displayed in a graphical user interface of the electronic device.

7. The medium of claim 6, comprising instructions to mitigate the unintended effect when the particular type of provided input has an average size larger than a specific type threshold.

8. The medium of claim 5, comprising instructions to mitigate the unintended effect when the particular type of provided input is different than the specific type threshold.

9. The medium of claim 8, wherein the specific type threshold is set to a click, and wherein the particular type of provided input received by the touchpad is a tap.

10. A system, comprising:
    an electronic device including a touchpad, and
    a driver included in the electronic device to:
        identify respective frequencies of particular types of provided inputs received by the touchpad, wherein the respective frequencies are a total number of a particular type of provided input over a period of time;
        identify average sizes of the particular types of provided inputs;
        set threshold types of provided input based on identified respective frequencies and average sizes of the particular types of inputs;
        compare a particular type of provided input received by the touchpad to the threshold types of provided input; and
        mitigate an unintended effect of the particular type of provided input received by the touchpad based on the comparison.

11. The system of claim 10, wherein the provided inputs include at least one of taps and clicks provided to the touchpad.

12. The system of claim 10, wherein the driver is to set a specific threshold type of provided input in response to a login to the electronic device.

* * * * *